United States Patent [19]

Jackson

[11] 4,091,618
[45] May 30, 1978

[54] OCEAN MOTION POWER GENERATING SYSTEM

[76] Inventor: Arlyn H. Jackson, 3128 Monterey St., Oxnard, Calif. 93030

[21] Appl. No.: 695,612

[22] Filed: Jun. 14, 1976

[51] Int. Cl.² ............................................... E02B 9/08
[52] U.S. Cl. ....................................... 60/497; 417/333
[58] Field of Search .......... 60/325, 397, 398, 495–507; 417/330–333, 337; 185/4, 33

[56] References Cited

U.S. PATENT DOCUMENTS

| | | | |
|---|---|---|---|
| 1,560,425 | 11/1925 | Huff | 417/333 |
| 3,205,969 | 9/1965 | Clark | 60/398 X |
| 3,307,827 | 3/1967 | Silvers et al. | 60/501 |
| 3,487,228 | 12/1969 | Kriegel | 417/331 |
| 3,504,648 | 4/1970 | Kriedt | 60/398 X |
| 3,664,125 | 5/1972 | Strange | 60/398 X |
| 3,970,415 | 7/1976 | Widecrantz et al. | 417/332 |

Primary Examiner—Allen M. Ostrager
Assistant Examiner—Stephen F. Husar
Attorney, Agent, or Firm—Warren T. Jessup

[57] ABSTRACT

A wave motion power generating system comprised of a floating buoy attached to a pump which pumps water from a container submerged below water level. The pump removes water from the container creating a hydrostatic head which can be used to draw water through a drive system for operating a power generator. The buoy may be in the form of a cylindrical ring mounted on the leg of an ocean platform with the pump being a cylindrical container also mounted on a leg well below the surface of the ocean. The motion created by ocean waves moves the buoy up and down operating the pump to create a void in a tank submerged well below the ocean surface, thus creating the hydrostatic head. This hydrostatic head can be used to drive a turbine which in turn operates a power generator.

6 Claims, 4 Drawing Figures

Fig. 1.
Fig. 2.
Fig. 3.
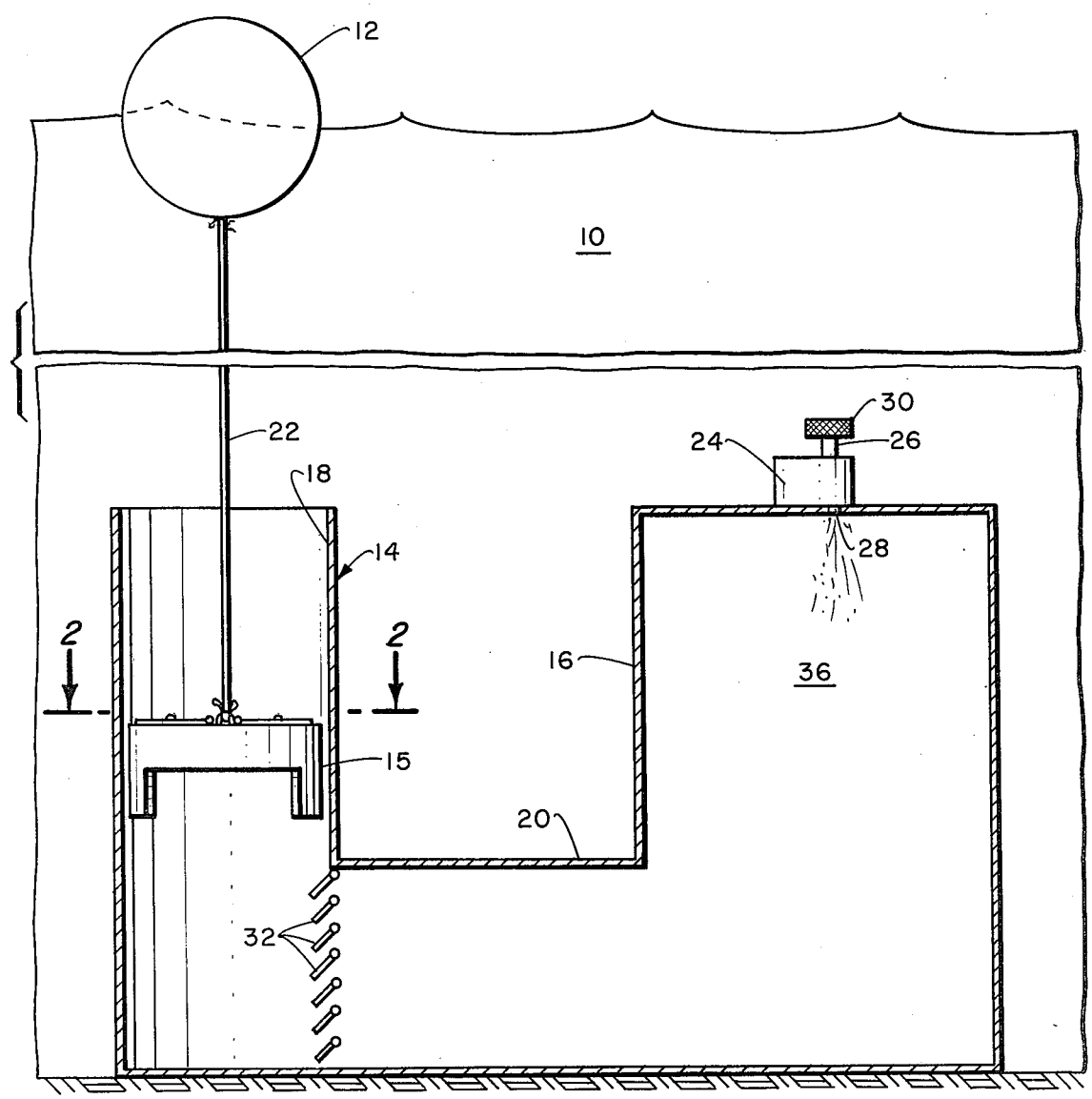
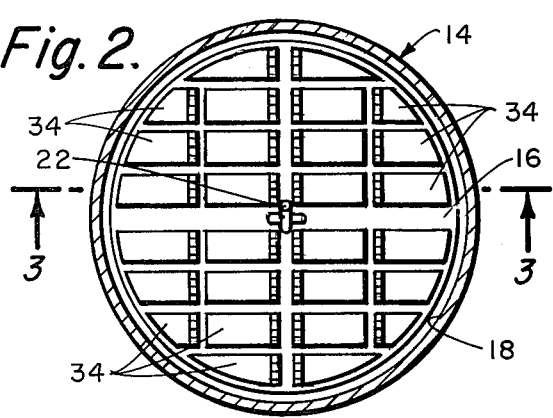
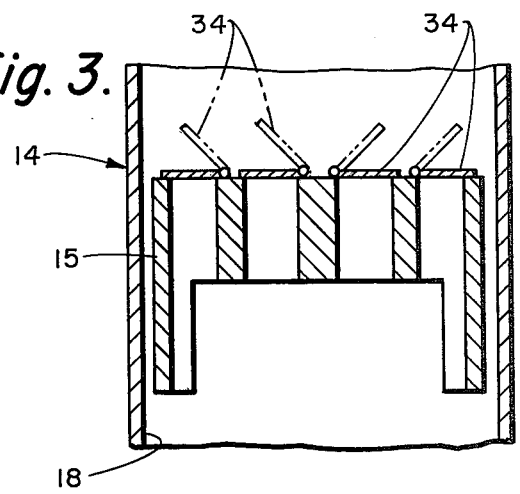

OCEAN MOTION POWER GENERATING SYSTEM

BACKGROUND OF THE INVENTION

This invention relates generally to two hydrostatic power generating systems and more particularly relates to systems for generating power through wave motion.

Systems have been developed for generating power by using the forces of nature and one of these is the forces generated by wave motion. One such system uses wave motion to pump water into a tank mounted on a platform well above sea level, which can be used to generate power. The water is released from the tank to drive a turbine which in turn generates power. A disadvantage of this system is the large expense for building the tank, as well as providing an area in which to place the tank. Also, the power generator must, of necessity, be reasonably close to the tank in order not to dissipate all the energy stored in the hydrostatic head created by the water in the tank.

SUMMARY OF THE INVENTION

The purpose of the present invention is to provide a simple and easy-to-construct system for generating power by utilizing wave motions.

The power generating system of this invention is comprised of a tank positioned beneath the surface of a body of water in which a void can be created, thus producing a hydrostatic head. Water is pumped out of the container by a pump attached to a buoy floating on the surface of the water, which moves up and down in response to wave motion. This invention is particularly suitable for use in the ocean where enormous depths are possible, creating huge hydrostatic heads with relatively small voids created under tons of water. The high hydrostatic head created by pumping the water out of the container is then used to draw water through a drive system which generates electrical power.

This system is also particularly suitable for use with ocean platforms which must provide their own power. This can be done by providing buoys on one or more legs of the platform which operate a pump also attached to the legs or leg of the platform at a distance below the surface of the ocean. The pump being operated by the buoy moving up and down on the leg of the platform pumps water out of the container anchored well below the surface of the ocean. The power generator would be situated on a platform and water would be drawn through the drive system by a siphon connected to the drive system and a conduit connected from the drive system to the void in the tank. Thus, water would be drawn from the ocean through the drive system and back to the void in the tank to generate power. If desired, auxiliary pumps could be provided on the platform to pump water out of the tank when the sea was too calm to create a void sufficient to generate power.

It is one object of the present invention to provide a power generating system by creating a hydrostatic head beneath the surface of a body of water.

Another object of the present invention is to provide a power generating system which creates a hydrostatic head by pumping water from a container by use of wave motion.

Yet another object of the present invention is to provide a power generating system in which a hydrostatic head is produced by creating a void beneath the ocean.

Still another object of the present invention is to provide a power generating system which can create a hydrostatic head by pumping water out of a container anchored beneath the ocean.

Other objects, advantages and novel features of the invention will become apparent from the following detailed description of the invention when considered in conjunction with the accompanying drawings.

BRIEF DESCRIPTION OF THE DRAWINGS

FIG. 1 is a diagram of the system of the invention in semi-schematic form.

FIG. 2 is a sectional view taken at 2—2 of FIG. 1 enlarged to show the detail of one embodiment of a pump for use with the system of FIG. 1.

FIG. 3 is another sectional view of the pump system taken at 3—3 of FIG. 2.

DETAILED DESCRIPTION OF THE PREFERRED EMBODIMENT

Figure 4:
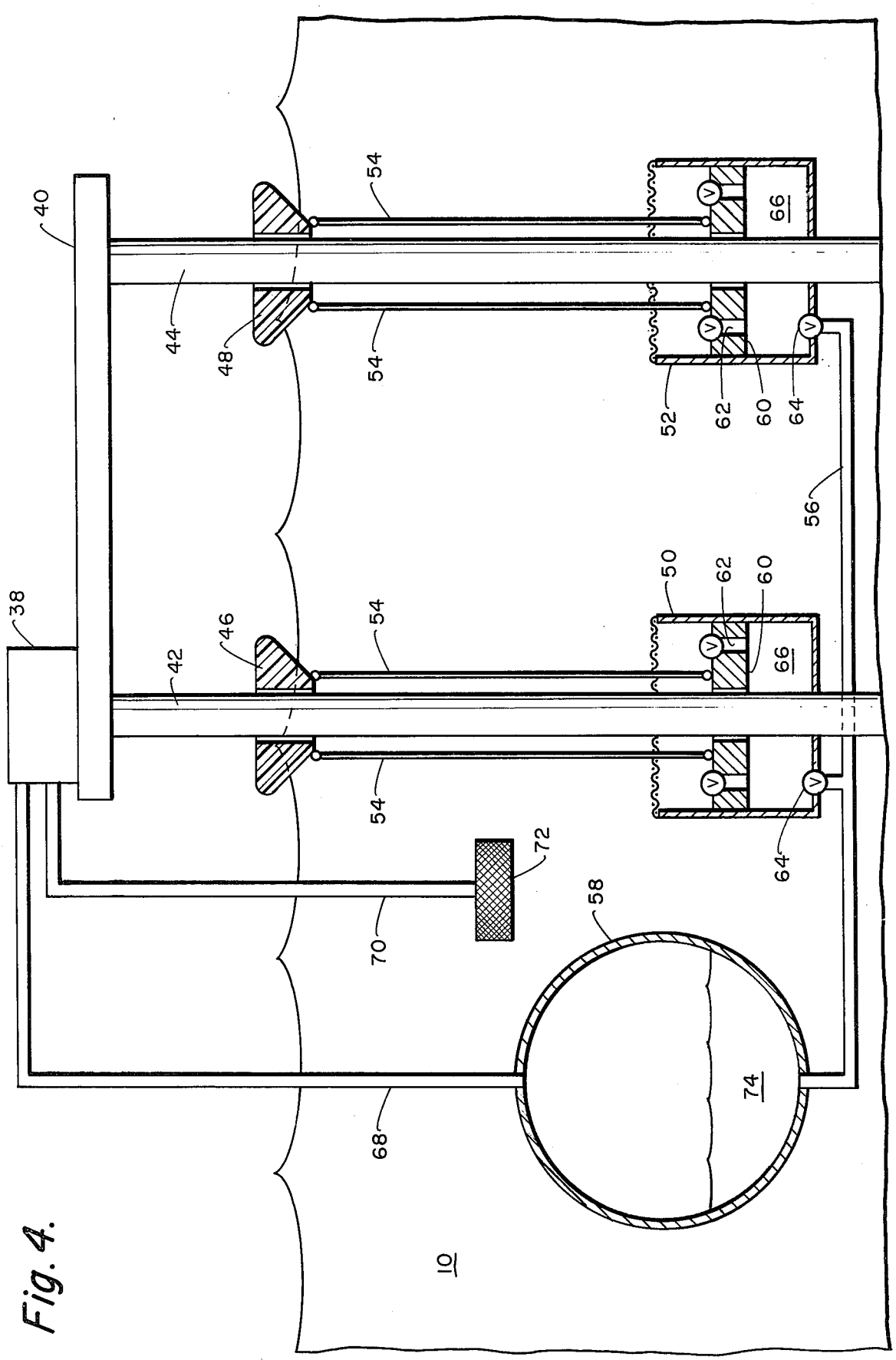
FIG. 4 is a semi-schematic diagram of a particular embodiment of the invention for use with ocean platforms.

The system shown in FIG. 1 illustrates the principle of using wave motion to generate power. In this figure a large buoy 12 floating on the ocean 10 is attached to a pump 14 for removing water from a tank or a container 16 to create a void. The pump 14 continuously pumps water out of the enclosure or tank 16 by action of wave motion on the buoy 12. This system is particularly adaptable to the ocean because of the ability to achieve great depths which will produce enormous hydrostatic heads and the good wave motion availabe in the ocean.

The pump 14 is comprised of a piston 15 and a hollow cylinder 18 joined to the enclosure 16 by a conduit 20. The piston 16 is joined to the buoy 12 by a cable 22. The pump 14 is shown relatively large in comparison to the container 16 merely for purposes of clarity and the particular size of each will have to be determined depending upon the depth and use of the system. It is only necessary that the pump 14 or a plurality of pumps, if desired, be sufficient to maintain a void in the enclosure or container 16.

A turbine 24 is positioned to make use of the hydrostatic head created in the container 16 by the action of the pump 14. Water is allowed to flow through an inlet pipe 26 having a suitable filter 30, through the turbine 24 into the tank 16 through an outlet 28. The force of the water flowing through the turbine 24 can be used to drive a power generator (not shown) in a manner known in the art. The turbine, of course, may be positioned at a remote location with the outlet 28 being a conduit connected from the remote position on the ocean floor, on land, or on a platform.

Since the pump 14 is a positive displacement type, a system of check valves in the form of vanes 32 are provided to connect the conduit 20 with the tank 16. When the piston 16 in the pump 14 moves down in the cylinder 18, the vanes 32 close preventing water from flowing back into the tank 16. When the piston 16 moves upward in the cylinder 18, the vanes 32 will open drawing water from the tank into the pump 14.

A similar check valve system may be employed with the piston 16 as shown in FIGS. 2 and 3. The piston 16 may be provided with a check valve in the form of a series of vanes 34 which open and close in response to movement of the piston in cylinder 18. When the piston 16 moves down in the cylinder 18, the vanes 34 will open as shown in phantom lines in FIG. 3, allowing water to flow through the piston to the ocean side of the pump 14. When the ocean wave motion moves the buoy upward, pulling the piston 16 upward in the cylinder 18, the vanes 34 will close, thus pumping water out of the piston into the ocean, creating a void in the container 16. The continuous action of the ocean waves on the buoy 12 causes the piston to rise and fall by means of its connection to the buoy through cable 22. Thus, the container 16 is constantly being pumped out by the action of the ocean waves.

The void area 36 in the tank 16 creates an ideal hydrostatic head which can be used for generating power. While only a single tank and a single pump are illustrated in FIG. 1, there can be one tank and many pumps allowing a number of smaller buoys to be used or a number of tanks which may be connected to a turbine 24 through a series of conduits, if desired.

FIG. 4 illustrates a particularly advantageous use of the system with ocean platforms. An ocean platform 40 is shown having legs 42 and 44 extending well below the surface of the ocean 10, and having buoys 46 and 48 in the shape of cylindrical collars on one or more legs. The buoys 46 and 48 are connected to pumps 50 and 52 respectively by means of cables 54. The pumps 50 and 52 are connected by a condit 56 to an enclosure 58 for creating the hydrostatic head as before. It should be noted that the platform 40 will usually have at least four, and often many more legs, but only two need be shown to illustrate the invention.

Each pump 50 and 52 has a piston 60 for drawing water from the container 58. In this figure the piston 60 is illustrated as having ball-type check valves 62, of which any number may be provided. Likewise, check valves 64 are provided between the pump and cavity 66 and the conduit 56. In cases where the platform 40 has numerous legs, a pump, such as illustrated, can be provided on each leg. By action of the ocean wave motion, the buoys 46 and 48 continually pump water out of the container 58, maintaining a constant hydrostatic head.

As before, this hydrostatic head can be used to drive a turbine 38, which in turn can power a generator in any suitable fashion. However, in this case the turbine 38 may be positioned on the platform and connected to the hydrostatic head of the container 58 by a conduit 68. The hydrostatic head draws water through the turbine 38 and conduit 68 by a second conduit 70 acting as a siphon having a suitable filter 72 attached. Water is drawn through the filter 72, the conduit 70, through the turbine 38, and back to the container 58, through the conduit 68. The turbine 38 can be continuously operated as long as there is a void, and thus a hydrostatic head is maintained in the container or enclosure 58. On the infrequent occasions the sea or ocean may be very calm and possibly insufficient to maintain a void, auxiliary pumps automatically are actuated by the water 74 rising in the tank 58 and can be used to maintain a minimum hydrostatic head. These pumps can be positioned at any convenient location and connected to the container 58 by suitable conduits (not shown). They would be operated, of course, by some auxiliary power source such as gas, oil, or battery.

Thus, there has been disclosed a system for utilizing wave motion to generate power by creating a void beneath the surface of the water which in turn produces a hydrostatic head. There are, of course, many variations which can be applied to this invention, such as using the legs 42, 44 of the platform 40 themselves for pumps. For example, if the legs themselves were hollow, then a piston could be placed inside them and the buoy be used to move the piston in the leg up and down, pumping water from strategically placed holes in the legs. Of course, the systems of check valves shown in the various embodiments would have to be used. Also, the container for creating the void can be positioned any distance below the surface, such as by anchors to the bottom and floating or actually positioned on the bottom and anchored.

The container can be a metal or concrete container placed on the ocean floor and anchored by the necessary weights or by its own weight. An enclosure or container could also be produced by pouring concrete on the ocean floor with footings dredged and filled. When cured, the soil and mud could be dredged from underneath the concrete. This technique could be used for making void containers many square miles in area which would allow for vast amounts of hydraulic water flow. This would probably require a sizeable number of ocean motion pumps working to keep the container empty and void of water. Because the power of nature, when used in the raw state, is very inconsistent and unpredictable, auxiliary conventional powered pumps to keep the void dry during periods of surface calm can be provided.

Still another way to create a large container for the void would be to explode a nuclear device placed well under the floor of a body of water, such as an ocean or lake. As soon as the radiation reached a safe level, intake and exhaust pipes could be placed into the chamber. The resultant hydrostatic pressure created by the removal of the water could be used to power an infinite variety of hydraulic and fluid turbines, motors, generators and tools. The novel principle of the invention of creating and maintaining a void under a body of water can be used to furnish power to any size of device used by our present or future technology. One such use is to generate electricity for remote work sites such as offshore drilling platforms as discussed above and also for weather buoys. The invention is completely compatible with present and future environmental requirements for power generation using non-polluting resources. Application of the principles of the invention incuding the syphoning techniques can also result in large savings of natural resources.

Obviously, many modifications and variations of the present invention are possible in light of the above teachings. It is therefore to be understood that the full scope of the invention is not limited to the details disclosed herein and may be practiced otherwise than as specifically described.

What is claimed is:

1. A power generating system for ocean platforms having a plurality of legs comprising:
    means for defining a void below the surface of a body of water to create a hydrostatic head;
    pumping means for removing water from said void to produce said hydrostatic head;
    said pumping means comprising at least one buoy surrounding and guided by one or more legs of said platform
    and a cylindrical piston pump surrounding one or more legs of said platform for pumping the water from said void;
    drive means for driving a power generator; and
    conduit means for drawing water through said drive means into said void.

2. The power generating system according to claim 1 wherein said means for defining a void comprises:

a tank anchored to the ocean bottom; and
pump means for pumping water out of said tank.

3. A hydrostatic power generating system comprising:
- an enclosure positioned beneath the surface of a body of water;
- a platform in said body of water supported by a plurality of legs;
- pump means for removing water from said enclosure to create a void beneath said body of water to produce a hydrostatic head,
- said pump means comprising at least one buoy surrounding and guided by the leg of said ocean platform,
- a cylindrical piston pump surrounding at least one of said legs at a predetermined distance below said water level and connecting means connecting said piston pump to said buoy whereby wave motions operate said pump;
- power generating means; and
- conduit means connecting said power generating means to said enclosure whereby water is forced through said power generating means into said enclosure by hydrostatic head created from said body of water.

4. The power generating system according to claim 3 wherein said power generator comprises a turbine mounted on said enclosure.

5. The power generating system according to claim 3 wherein said power generator is mounted above water level; and
- said conduit means includes a siphon conduit to draw water through said power generator.

6. A method for creating a natural hydrostatic head for generating a power for use on an ocean platform having a plurality of legs comprising:
- positioning an enclosure below a body of water;
- positioning at least one or more cylindrical buoys in a surrounding relation about one or more legs of said platform;
- positioning at least one or more cylindrical piston pumps in a surrounding relation about one or more legs of said platform;
- connecting said one or more buoys to said one or more cylindrical pumps whereby wave motion operates said one or more pumps;
- pumping water out of said enclosure to create a void beneath said body of water to produce a hydrostatic head;
- drawing water into said void created in said enclosure to drive a power generator.

* * * * *